Nov. 25, 1952 H. McK. RIGGLE ET AL 2,619,139
MACHINE FOR GRATING THE PEEL ON CITRUS FRUITS
Filed Aug. 1, 1949 7 Sheets-Sheet 1

INVENTORS
HOBERT M. RIGGLE and
WALTER B. ROSE

By Cushman, Darby & Cushman
ATTORNEYS

Inventors
HOBERT M. RIGGLE
WALTER B. ROSE
By Cushman, Darby & Cushman
ATTORNEYS

Nov. 25, 1952 H. McK. RIGGLE ET AL 2,619,139
MACHINE FOR GRATING THE PEEL ON CITRUS FRUITS
Filed Aug. 1, 1949 7 Sheets-Sheet 7

Inventors
HOBERT M. RIGGLE and
WALTER B ROSE

By Cushman, Darby & Cushman
ATTORNEYS

Patented Nov. 25, 1952

2,619,139

UNITED STATES PATENT OFFICE 2,619,139

MACHINE FOR GRATING THE PEEL ON CITRUS FRUITS

Hobert McKinley Riggle, Dunedin, and Walter B. Rose, Clearwater, Fla., assignors, by mesne assignments, to Extraction, Inc., a corporation of Delaware Application August 1, 1949, Serial No. 107,986

15 Claims. (Cl. 146—3)

This invention relates to grating machines, more particularly to machines for removing the outer rind, or colored surface, of citrus fruits.

The outer rind of citrus fruits contains a high concentration of oil, and lesser amounts of gum, wax and resin. In the extraction of citrus fruit juices, these substances, particularly the rind oil, have been found to taint the juice with an unnatural and disagreeable taste, and to cause progressive deterioration of taste and color. Considerable research has been devoted to methods of removing the rind oil from extracted juice, but no satisfactory method of complete separation has yet been found. The oil and other components of the outer rind also contaminate the pulp remaining after juice extraction, which can be processed to yield by-products such as pectin, sugars and cattle food, and make the recovery of these by-products more difficult, and the products themselves less desirable.

The outer rind of citrus fruits and the oils extracted therefrom are useful in flavoring foodstuffs, and have found wide employment in the flavoring and decoration of bakery and confectionery products.

It is an object of the present invention to provide a machine for efficiently and completely removing the outer rind of citrus fruits from the whole fruit, before the extraction of juice therefrom.

It is a further object of this invention to provide means to remove and recover the outer rind of citrus fruits, for extraction of oils and further utilization.

A further object of this invention is to provide means for recovering volatile oils liberated by disruption of the outer surface of citrus fruits.

A further object is to provide a grating machine for removing the outer rind from citrus fruits of random size, without prior grading.

Further objects of the invention will be in part obvious and in part pointed out hereinafter.

The invention and the novel features thereof may best be made clear from the following description and the accompanying drawings, in which.

Figure 2:
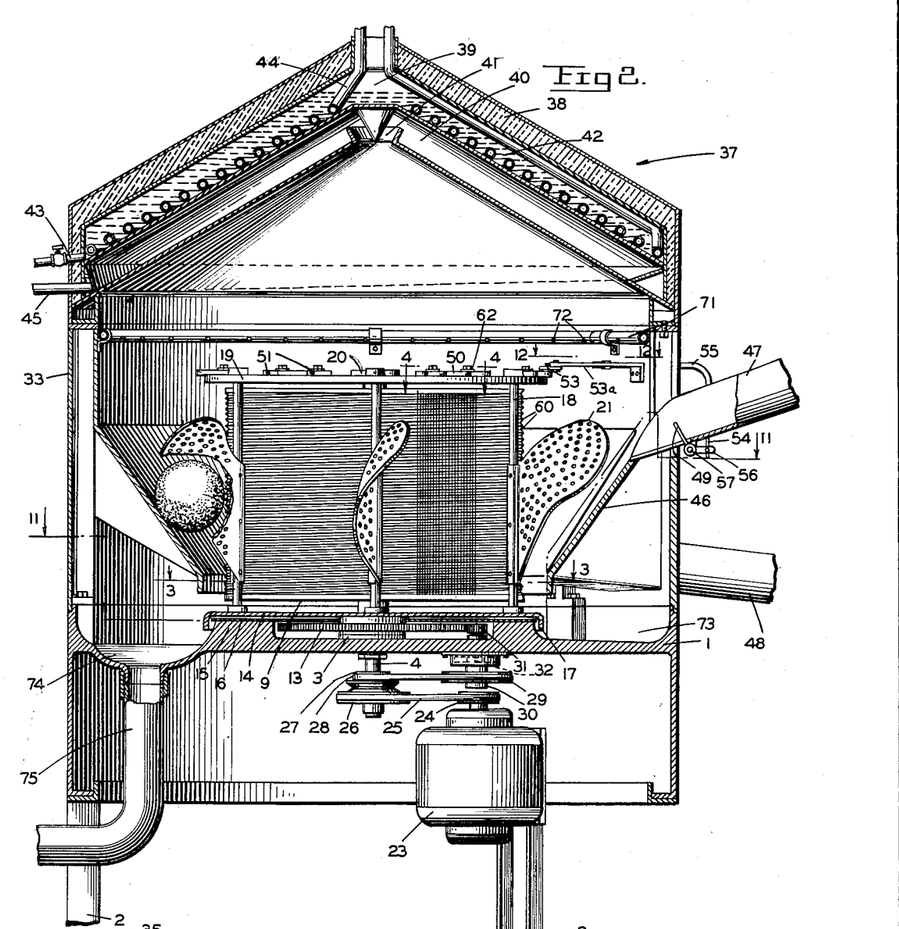
Figure 2 is a sectional elevation taken along line 2—2 in Figure 1.
Figure 6:
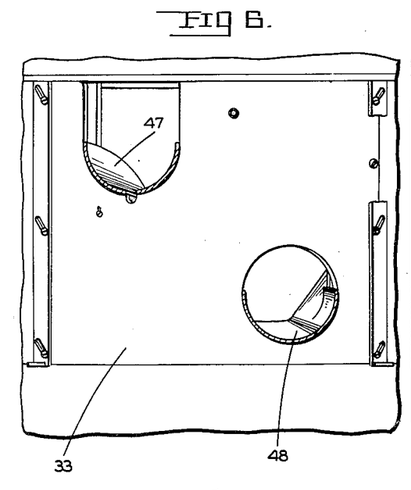
Figure 6 is a sectional elevation taken along line 6—6 of Figure 1, showing details of the inlet and outlet chutes.
Figure 7:
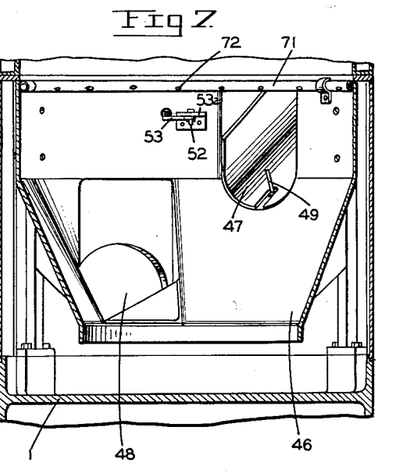
Figure 7 is a sectional elevation taken along line 7—7 of Figure 1, showing further details of the inlet and outlet chutes.
Figure 16:
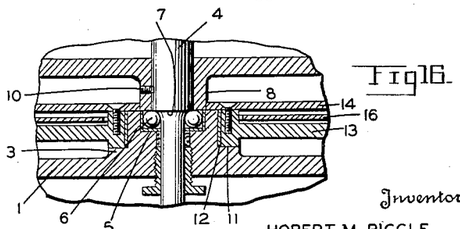
Figure 16 is a section showing details of the grater cylinder mounting.

Referring to the drawings, Figure 2 shows a preferred embodiment of the invention, comprising the base 1, suitably supported as by standards 2. The base 1 is provided with a central boss 3, through which extends the vertical drive shaft 4. As may best be seen in Figure 16, boss 3 comprises an inner recess 5, containing the ball bearing 6, which rotatably supports the shoulder 7 of drive shaft 4. The hub 8 of the grater cylinder 9 is fixed to drive shaft 4 above shoulder 7 by means of the set screw 10. The outer recess 11 of boss 3 contains the bearing 12, which in conjunction with boss 3 rotatably supports the gear 13 and the associated feed plate 14. The annular boss 15 of base 1 encloses gear 13 and supports the seal 16, which extends inwardly between gear 13 and feed plate 14. The outer edge of feed plate 14 is turned down to form the lip 17, positioned and adapted to cooperate with seal 16 to isolate the space including gear 13 from the grating compartment above feed plate 14.

Figures 14, 15:
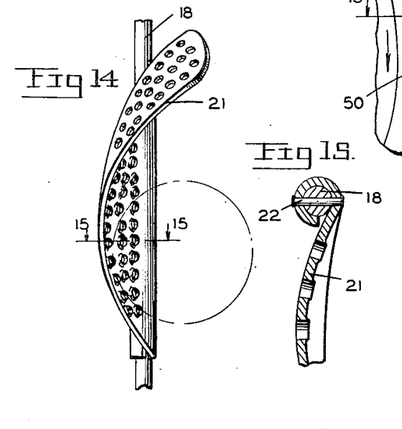
Figure 14 is an elevation of a fruit feeding vane.
Figure 15 is a section on line 15—15 of Figure 14, showing details of attachment of the vane.

Suitably mounted on feed plate 14 are a plurality of radially spaced posts 18, which in turn support and are retained by the feed wheel 19. The hub 20 of feed wheel 19 encloses and bears upon the upper end of drive shaft 4. Extending outwardly from each of the posts 18 is a cup-shaped feeding vane 21, fixed thereto as by pins 22 (Figure 15).

Drive shaft 4 and gear 13 are driven in the same direction at different speeds, conveniently by a single source of power such as the motor 23, suitably mounted below base 1. As shown, motor 23 drives shaft 4 directly by means of drive pulley 24, belt 25 and shaft pulley 26. Gear 13 is driven from drive shaft 4 through take-off pulley 27, belt 28, pulley 29, stub shaft 30, pinion 31 and the associated reversing pinion 32, thereby effecting rotation of gear 13 and the associated feeding vanes 21 in the same direction as drive shaft 4 and the grater cylinder 9 affixed thereto, but at greatly reduced speed. It will be apparent to those skilled in the art that the drive of shaft 4 and gear 13 may be suitably connected and coordinated by equivalent means, mechanical or otherwise, or may be separate and distinct if desired.

Figures 17, 18:
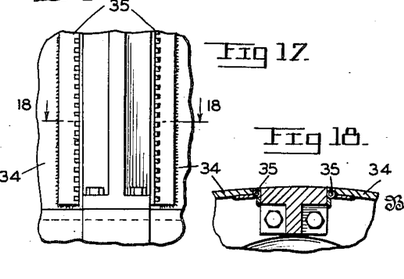
Figure 17 is an elevation showing details of construction of the outer casing of the machine.
Figure 18 is a section on line 18—18 of Figure 17, showing further details of the outer casing hinges.

Supported on the periphery of base 1 and enclosing the grating compartment of the apparatus is the casing 33, in which the hinged sections 34 are provided for convenience of access and cleaning. The hinged sections 34 are pivotally supported by piano hinges 35 (Figures 17 and 18), and secured by the toggles 36. Enclosing the top of casing 33 is the vapor hood indicated generally as 37. The hood 37 may be constructed in the shape of an inverted cone, as shown, and comprises an outer layer of heat insulation 38, a central coolant compartment 39, and an inner condensing section 40, in communication with the grating compartment of the machine through the central vapor trap 41. Coolant compartment 39 is filled with a brine 42, and is provided with the drain 43 therefor. The brine 42 is cooled by a suitable refrigerant circulated through refrigerant coil 44 by any suitable means, not shown. The bottom of condensing section 40 conveniently slopes to the condensate outlet 45.

Enclosing grater cylinder 9 and feeding vanes 21 within casing 33 is the annular inclined shelf 46, converging toward the bottom of the grater cylinder. In association with shelf 46 adjacent the top thereof, and extending through an opening provided therefor in casing 33 is the inlet chute 47, and associated with the shelf 46 near the bottom thereof, at a point radially displaced from the inlet chute, is the outlet chute 48, similarly extending to the exterior of casing 33.

In operation, fruit fed into the machine through inlet chute 47 falls into contact with shelf 46 and the grater cylinder 9, is carried around the machine by the combined action of the grater cylinder and the feeding vanes 21, as will be explained in detail, and then leaves the machine through outlet chute 48. The radial displacement of outlet chute 48 from inlet chute 47 is desirably somewhat less than 360° in the direction of rotation of the grater cylinder 9, so that the fruit is grated during substantially one complete circuit of the machine, and is allowed to drop therefrom just prior to the feed of additional fruit to be grated into the spaces between successive feeding vanes 21. The path of fruit through the machine is illustrated diagrammatically in Figure 1.

Figure 8:
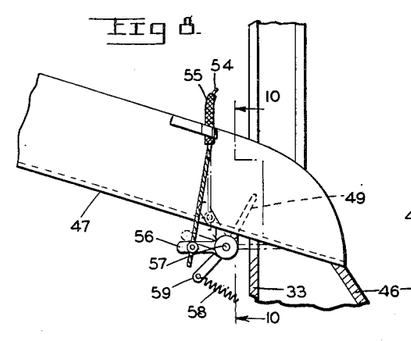
Figure 8 is an elevation taken on the line 8—8 of Figure 1, showing details of the fruit feeding mechanism.
Figure 9:
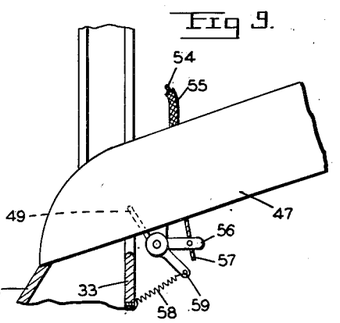
Figure 9 is an elevation taken on the line 9—9 of Figure 1, showing further details of the fruit feeding mechanism.
Figure 10:
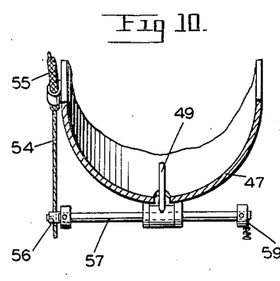
Figure 10 is a sectional elevation of the fruit inlet chute, taken along line 10—10 of Figure 8.
Figure 11:
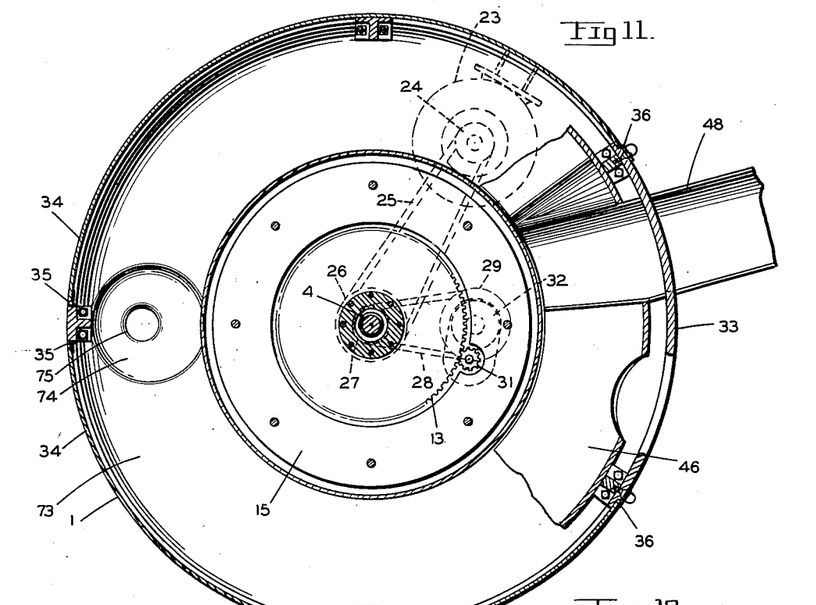
Figure 11 is a sectional plan taken along line 11—11 of Figure 2, showing details of the grater and feeding vane drives.
Figure 12:
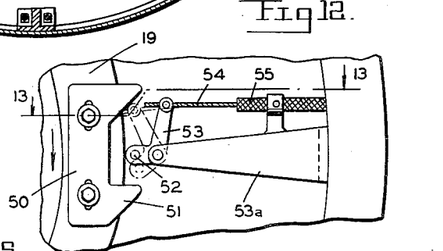
Figure 12 is a plan view taken on the line 12—12 of Figure 2, showing details of the feeding cams and the associated fruit feeding mechanism.
Figure 13:
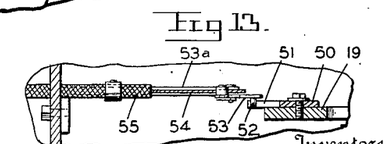
Figure 13 is a sectional elevation taken along line 13—13 of Figure 12, showing further details of the cam and feeding mechanism.

The feed of fruit, for example oranges, to the spaces between successive feeding vanes 21 is preferably automatically regulated, to effect the feed of a predetermined number of oranges into each space. This is accomplished, in the embodiment shown, by means of the detent 49, which is controlled by the cam plates 50, suitably secured to feed wheel 19, and corresponding in number to the feeding vanes 21. Each of the cam plates 50 comprises a plurality of cams 51 extending therefrom, positioned and adapted to engage the cam follower 52 of the bellcrank 53, pivotally supported by the bracket 53a extending from the upper portion of shelf 46, and displace them to the position shown in dotted lines in Figure 12. The displacement of bellcrank 53 effects the displacement of the attached flexible cable 54, guided by the conduit 55. As may best be seen in Figures 8, 9 and 10, the other end of cable 54 is fastened to the crank 56, extending from an end of the rocking shaft 57, which supports detent 49. The displacement of bellcrank 53 by one of the cams 51, it will be readily seen, causes detent 49 to move downwardly, allowing the passage of an orange thereover. Upon the passage of the cam 51 out of engagement with cam follower 52 of the bellcrank 53, the mechanism is caused to snap back to its original position by spring 58, acting on rocking shaft 57 through the crank 59. The cams 51 are desirably of a size to activate detent 49 for a period sufficient only to permit passage of a single orange. It will thus be seen that the provision of the desired number of cams 51 on each of the cam plates 50 effects the feed of the corresponding number of oranges into each of the spaces between successive feeding vanes 21.

Figures 1, 3, 4, 5:
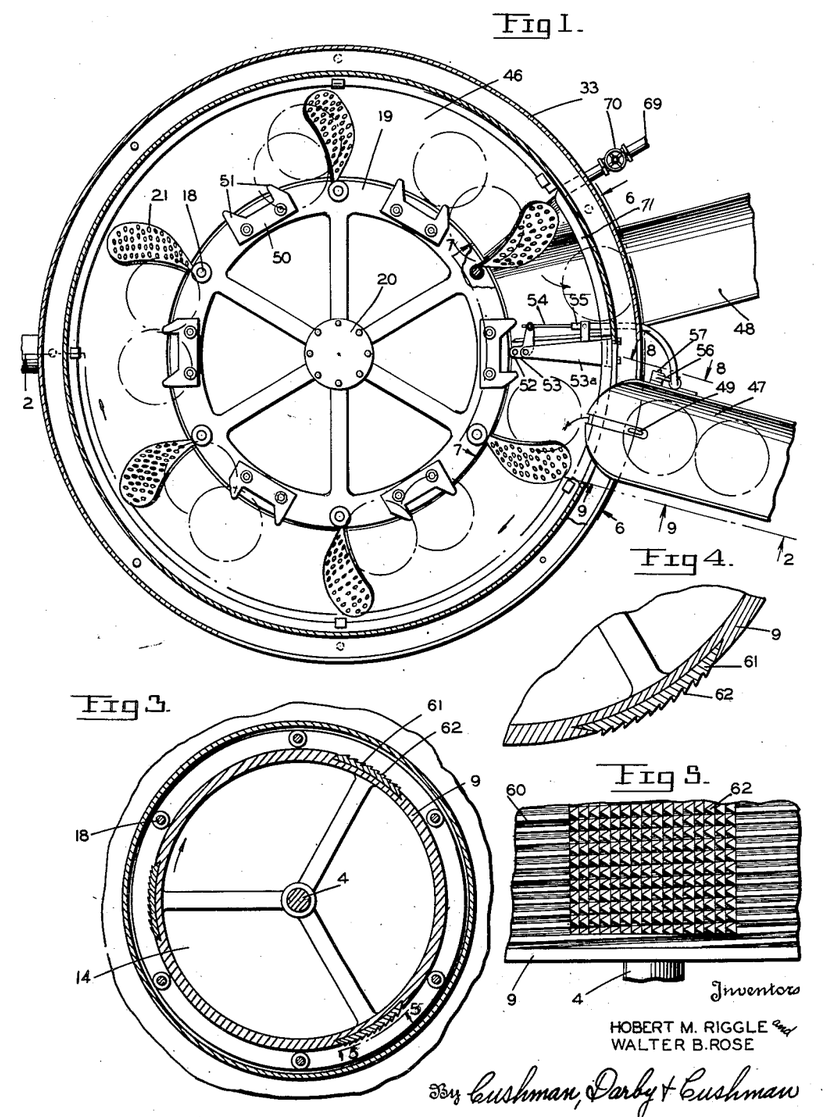
Figure 1 is a sectional plan of a preferred embodiment of the invention, showing in detail the fruit feeding mechanism.
Figure 3 is a section taken on the line 3—3 of Figure 2, showing details of construction of the grater cylinder.
Figure 4 is an enlarged plan section, taken on the line 4—4 of Figure 2, showing details of one of the grater inserts.
Figure 5 is an enlarged elevation, taken along line 5—5 of Figure 3, showing further details of one of the grater inserts.

The surface of greater cylinder 9 is provided with an elongated irregularity in helical form, such as the screw thread 60, and one or more longitudinal grater inserts 61. The inserts 61 comprise outer grater surfaces 62, knurled, toothed or otherwise roughened to a depth approximating the thickness of outer rind to be removed. The pattern of the grater surfaces 62 may carry on the continuity of screw thread 60, as shown in Figure 5. The grater surfaces 62 may be an integral part of the cylinder surface, suitably roughened.

Figure 19:
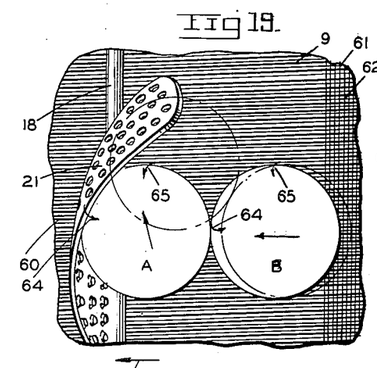
Figures 19 through 21 are a series of enlarged elevations of the grater cylinder and a feeding vane, showing the progressive action thereof on fruit being treated.
Figure 20:
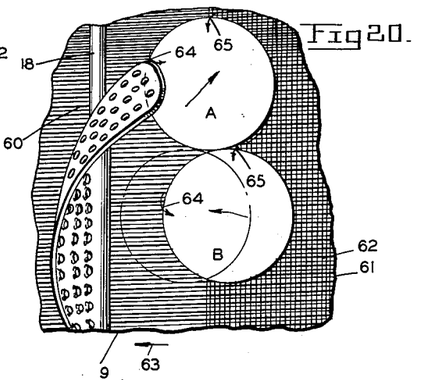
Figure 21:
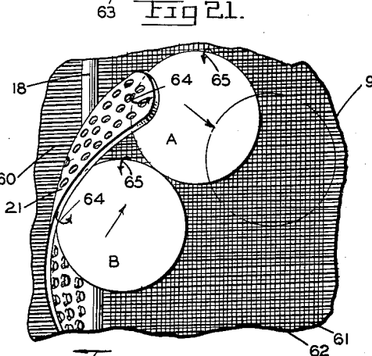

The grating action of the machine will now be described in detail. On entering the machine, the oranges fall into contact with the grater cylinder 9 and the inclined shelf 46. Referring particularly to Figures 19, 20 and 21, it will be seen that with the grater cylinder rotating at high speed in the direction of the arrow 63, and the feeding vanes rotating in the same direction at low speed, the oranges will be impelled by the surface friction of the cylinder toward the concave surface of the slow-moving vanes and held thereagainst. The surface friction of the grater cylinder being greater than that of the vane and the shelf combined, the cylinder will cause the oranges to rotate in the direction of the arrows 64, against the restraining influence of the vane and shelf. The screw thread 60 preferably descends in the direction of rotation, and thereby lifts the abutting surfaces of the oranges as it moves past them, causing further rotation of the oranges in the direction of the arrows 65. The combined action of the grater cylinder, the vane and the shelf causes the oranges to climb the vane until no longer held against the cylinder by contact of the shelf, whereupon, under guiding influence of the upper end of the vane, they fall backward and downward until once more in contact with the cylinder and the shelf.

This is sequentially illustrated in Figures 19, 20 and 21. In Figure 19 orange A is rotating in the direction of arrows 64 and 65 and is ascending the vane 21, while orange B is similarly rotating and is impelled against orange A. In Figure 20, orange A has risen until it is no longer held against the cylinder by contact of the shelf, and is being further displaced upwardly by the movement of orange B toward the vane 21. In Figure 21, orange B has passed under orange A into contact with the vane, and orange A is free to fall under the influence of gravity to the position formerly occupied by orange B. The combined effect of these motions is to constantly expose different surface areas of the oranges to the grater cylinder, resulting in complete exposure of the surfaces of the oranges thereto in a minimum of time.

Figure 22:
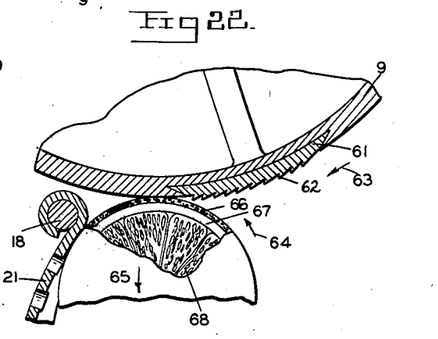
Figures 22 through 24 are a series of enlarged plan views of the grater cylinder and a feeding vane, further showing the progressive action thereof on fruit being treated.
Figure 23:
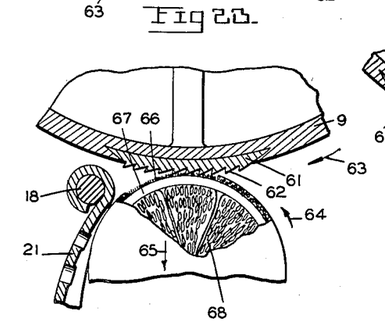
Figure 24:
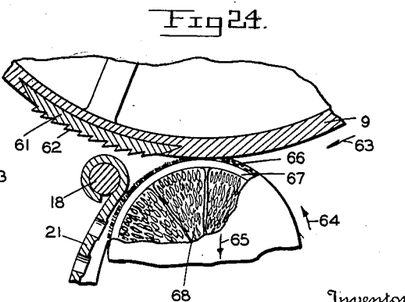

The action of the grater surfaces 62 is sequentially illustrated in Figures 22, 23 and 24. Figure 22 shows an orange in contact with a vane and the threaded portion of the grater cylinder. The orange is partially in section, to show the colored or outer rind 66, comprising a multiplicity of oil-containing cells, the pulpy or inner rind 67 and the juice sections 68. In Figure 23, the grater surface 62 has advanced relative to the orange and the vane and engaged the orange, removing a portion of the outer rind therefrom. It will be understood that the velocity of the grater surface is such that the inertia of the orange is sufficient to hold it relatively still against the action of the grater surface. Figure 24 shows the grater surface advanced out of contact with the orange, and the orange, with a portion of the outer rind removed, again in contact with the threaded portion of the cylinder and being rotated thereby.

The peripheral speed of the cylinder, the pitch of the helical irregularity therein, the degree of roughness of the longitudinal grater surface and the angle of convergence of the inclined shelf theretoward all are desirably adjusted and coordinated to effect a complete removal of the outer rind of the fruit in a single circuit of the machine from inlet chute to outlet chute, without more than incidental removal of the pulpy inner rind. It is particularly to be noted that the effective operation of the machine does not depend upon uniformity of size of the fruit acted upon. On the contrary, the machine is especially adapted to grate ungraded fruit of random size, uniformly and completely. The fruit is discharged through the exit chute as white globes entirely free of outer rind, from which juice may be extracted and the rind pulp recovered, both entirely free of rind oil.

The outer rind grated from the fruit may be efficiently removed and recovered by means of a liquid spray. A suitable liquid, such as water, is conducted into casing 33 by any suitable means, such as the pipe 69. Pipe 69 is connected by valve 70 to the spray tube 71, encircling casing 33 adjacent the top thereof. Spaced along the spray tube 71 are a plurality of openings or jets 72, directed generally at the grater cylinder 9. During operation of the spray means, water or other suitable liquid is forced into spray tube 71 under high pressure and issued through jets 72 in the form of high velocity streams. The streams impinge upon the grater cylinder 9, feeding vanes 21, inclined shelf 46 and the fruit being grated, washing the rind particles, oil and other products of the grating action into the annular trough 73, which may be an integral part of the base 1, as shown in Figure 2. The water and the grating products collect in the well 74, whence they are drawn or pumped through drain pipe 75 to be stored or subjected to extraction treatment. It will be evident that the pressure in the spray tube 71, and the spacing and size of jets 72 are desirably selected to attain thorough and efficient cleaning of the grater cylinder and associated mechanism with a minimum volume of water, thereby simplifying the extraction of rind oil and other products therefrom.

It has been found that in the disruption of the oil cells of the outer rind by the grater surfaces volatile components of the rind oils are released and flash off into the ambient atmosphere as vapor. This vapor, which is only partially absorbed by the water spray, constitutes a valuable fraction of the rind oil, and is condensed and collected, in the preferred embodiment shown, in the condensing section 40 of the vapor hood 37. By this means, not only is complete recovery of the rind oil attained, but also separation of the most volatile fraction thereof. While the condensing section 40 is conveniently incorporated into the hood of the machine, it may be located elsewhere, and the vapors conducted or forced thereto by any suitable means.

Figure 30:
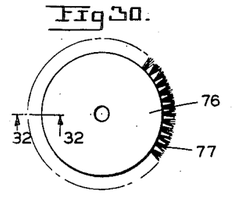
Figure 30 is a plan view of a modified grater cylinder, in the form of a polishing brush.
Figure 31:
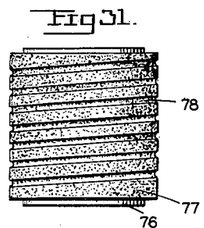
Figure 31 is an elevation of the polishing brush of Figure 30, showing the helical irregularity in the surface thereof.
Figure 32:
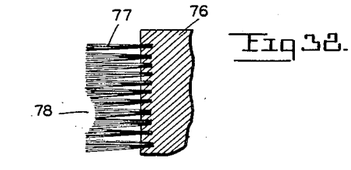
Figure 32 is an enlarged section taken on the line 32—32 of Figure 30.

The grater inserts 62 are preferably replaceable, and may be manufactured in various degrees of roughness, for grating different varieties of citrus fruits and for other conditions of service. While the machine is particularly adapted to the grating of citrus fruit, its utility is not limited thereto, but includes the grating, skinning, polishing and other treatment of other fruits and vegetables as well. Figures 30, 31 and 32 show a modified grater cylinder in the form of a polishing brush, indicated generally as 76, to the outer surface of which are affixed the outstanding bristles 77, adapted to clean and polish fruits and vegetables by wiping contact therewith. In the effective surface formed by the outer ends of the bristles 77 is formed the helical groove 78, best seen in Figures 31 and 32, to cause the characteristic rotating action previously described. In using the brush 76 in the machine, the spray system may be utilized to dispense wax or other liquid, if desired. It is to be specifically understood that the term "grating cylinder," wherever it appears throughout the specification and claims, is intended to include modified forms thereof, such as the polishing brush 76.

The grating machine of this invention may be operated at high speed, and has a correspondingly high capacity, while occupying but little floor space. It will be apparent to those skilled in the art that the capacity of the machine may be further increased by multiplying units thereof. For example, a plurality of units may be vertically banked, employing a common grater cylinder and a common drive for the feeding vanes.

Figure 25:
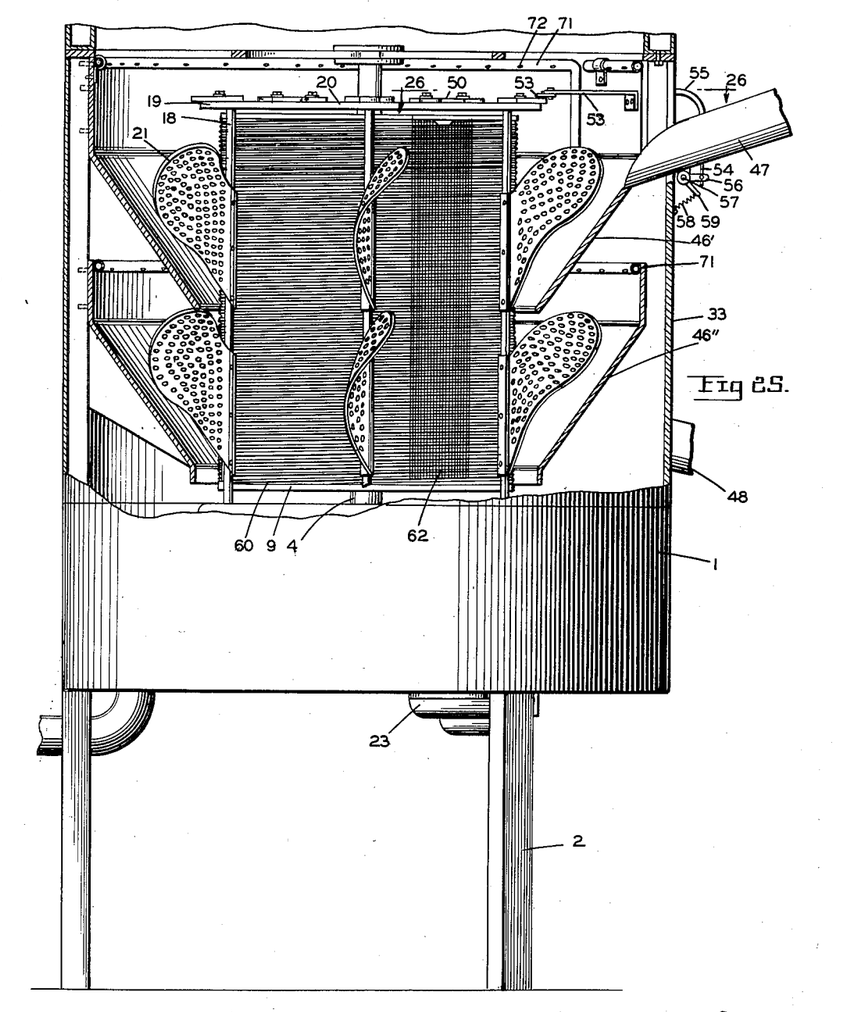
Figure 25 is an elevation with parts broken away of a modification of the machine of the present invention.

A further modification of the machine of this invention is shown in Figures 25 through 29, wherein an elongated grater cylinder of smaller diameter is employed, and the fruit caused to make two circuits thereof, at different levels. As best seen in Figure 25, this modification comprises two vertically spaced inclined shelves, and two correspondingly spaced sets of feeding vanes 21, supported by the elongated posts 18. The inlet chute 47 is associated with the upper shelf 46' adjacent the top thereof, in the manner previously described, and the outlet chute 48 is associated with the lower shelf 46" near the bottom thereof, at a point radially displaced from the inlet chute. The radial displacement of the outlet chute 48 from inlet chute 47 is desirably less, in the direction of rotation, than in the embodiment previously described, for reasons presently apparent.

Figure 26:
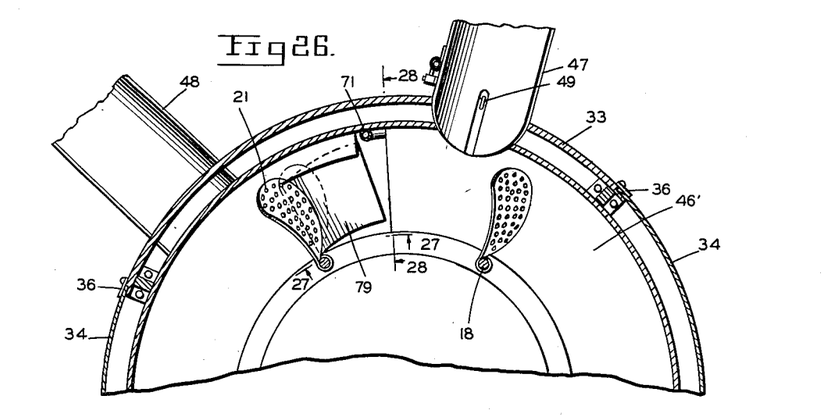
Figure 26 is a partial plan section taken on the line 26—26 of Figure 25.
Figure 27:
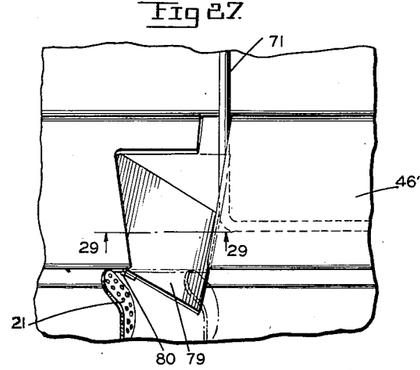
Figure 27 is an elevational view taken along line 27—27 of Figure 26, showing details of the drop chute in the upper inclined shelf of the machine.
Figure 28:
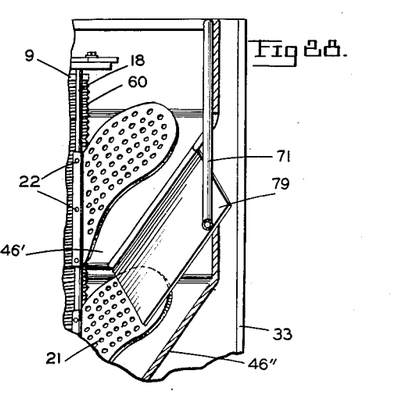
Figure 28 is a sectional elevation showing further details of the drop chute, taken on the line 28—28 of Figure 26.
Figure 29:
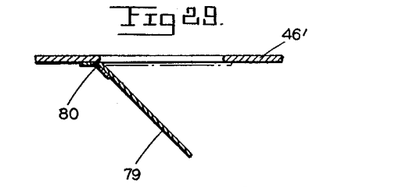
Figure 29 is a section taken on the line 29—29 of Figure 27, showing details of the mounting of the drop chute.

The upper inclined shelf 46' is provided at a point radially intermediate the inlet and outlet chutes with the drop chute 79, pivotally secured to shelf 46' by means of the hinge 80. The drop chute 79 is positioned and adapted, as shown in Figures 26, 27 and 28, to be raised and substantially closed by passage thereunder of each feeding vane 21, falling open under the influence of gravity when not so engaged. In operation, fruit is fed through inlet chute 47 in automatically coordinated fashion as before, and is carried around the grater cylinder on the upper shelf 46' until it reaches the drop chute 79, through which it falls to the lower shelf 46", upon which it is carried around the grater cylinder once more and then discharged through the outlet chute 48. It has been found desirable to extend the spray tube 71 through another circuit of the casing 33 at a lower level, corresponding to the lower shelf 46", as shown in Figures 25 and 28, thereby insuring thorough and efficient washing of both inclined shelves, the entire length of the grater cylinder, both sets of feeding vanes, and all the fruit in the machine.

As before, the peripheral speed of the cylinder, the pitch of the helical irregularity therein, the degree of roughness of the longitudinal grater surface and the angle of convergence of the inclined shelves theretoward all are desirably adjusted and coordinated to effect a complete removal of the outer rind of the fruit in a single circuit of the machine from inlet chute to outlet chute, that is, in two circuits of the grater cylinder. The relative radial displacement of outlet chute 48, drop chute 79, and inlet chute 47 is adjusted so that spaces between successive feeding vanes on the level of the upper shelf 46' are emptied of fruit through drop chute 79 immediately prior to the feed of raw fruit thereinto through inlet chute 47, and spaces between successive feeding vanes on the level of the lower shelf 46" are emptied of fruit through the outlet chute 48 immediately prior to the feed of partially grated fruit thereinto through the drop chute 79. In other respects, the operation of the device is substantially identical with that of the embodiment previously described.

It will be apparent that the machine may comprise more than two inclined shelves if desired, and the grating action carried out at three or more levels.

It will thus be seen, that there has been provided by this invention a structure in which the various objects hereinbefore set forth together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

What is claimed is:

1. A grating machine comprising a grater cylinder mounted for vertical axial rotation, an inclined shelf concentric therewith and converging toward the lower end thereof, a plurality of radially spaced feeding vanes mounted between said shelf and said grater cylinder for movement about the axis of said cylinder, an inlet chute associated with said shelf, detent means for regulating the feed through said inlet chute, a plurality of cams associated with each of said vanes for controlling the operation of said detent means, and an outlet chute associated with said shelf at a point spaced from said inlet chute.

2. A grating machine comprising a grater cylinder mounted for vertical axial rotation, an inclined shelf concentric therewith and converging toward the lower end thereof, a rotary member comprising feeding vanes mounted between said shelf and said grater cylinder for movement about the axis of said cylinder, an inlet chute arranged to supply articles to be grated to said shelf, an outlet chute for receiving grated articles from said shelf at a point spaced from said inlet chute, and means operated by rotation of said rotary member for causing delivery of a single article to be grated from said inlet chute into the space between each pair of said vanes.

3. A grating machine comprising a grater cylinder mounted for vertical axial rotation, an inclined shelf concentric therewith and converging toward the lower end thereof, a feeding vane mounted between said shelf and said grater cylinder for movement about the axis of said cylinder, an inlet chute arranged to supply articles to be grated to said shelf, means at the shelf end of the inlet chute for regulating the feed therethrough, means operated in synchronism with said vane for engaging and actuating said feed regulating means when the same is in the region of said inlet chute for releasing an article to be grated to said shelf means, and an outlet chute for receiving grated articles from said shelf at a point spaced circumferentially about the shelf from said inlet chute.

4. A grating machine for citrus fruit and the like, comprising a grater cylinder mounted for vertical axial rotation, a conical shelf concentric with said cylinder and convergent downwardly, a feeding vane mounted between said shelf and grater cylinder for rotation about the axis of said cylinder, and means for driving said vane and said cylinder in relative rotation, said cylinder comprising a spiral feeding groove on its periphery and an axially extending grater surface on a part of the periphery of the cylinder.

5. A grating machine for citrus fruits and the like, comprising a grater cylinder mounted for vertical axial rotation, a conical shelf concentric with said cylinder and convergent downwardly, a feeding vane mounted between said shelf and said grater cylinder for rotation about the axis of said cylinder, and means for driving said vane and said cylinder in the same direction with the cylinder revolving more rapidly than the vane, said cylinder comprising a spiral feeding groove on its periphery and an axially extending grater surface on a part of the periphery of the cylinder.

6. A grating machine for citrus fruits and the like, comprising a grater cylinder mounted for vertical axial rotation, a conical shelf concentric with said cylinder and convergent downwardly, a feeding vane mounted between said shelf and said grater cylinder for rotation about the axis of said cylinder, and means for driving said vane and said cylinder in the same direction with the cylinder revolving more rapidly than the vane, said cylinder having a spiral feed groove about its periphery falling in the direction of rotation of the cylinder and spaced axially extending grater surfaces on the periphery of the cylinder.

7. A grating machine comprising a casing, a grater cylinder mounted for vertical axial rotation within said casing, an inclined shelf within said casing concentric with said cylinder and converging towards the lower end thereof, a feeding vane mounted between said shelf and said grater cylinder for movement about the axis of said cylinder, means for directing a liquid spray generally at said cylinder, means on said casing below said cylinder for collecting and draining the sprayed liquid, vertically spaced upwardly tapering cones on top of said casing, the lower of said cones being apertured at its apex, and means connected into the space between said cones at the periphery thereof to draw off condensation therefrom.

8. A grating machine comprising a casing, a grater cylinder mounted for vertical axial rotation within said casing, an inclined shelf within said casing concentric with said cylinder and converging toward the lower end thereof, a feeding vane mounted between said shelf and said grater cylinder for movement about the axis of said cylinder, means for directing a liquid spray against said cylinder, means on said casing below said cylinder for collecting and draining the sprayed liquid, vertically spaced upwardly convergent cones mounted on top of said casing, the lower of said cones being apertured at its apex, means above the upper of said cones refrigerating the said upper of said cones, and means connected into the space between said cones at the periphery thereof for drawing off condensation therefrom.

9. A grating machine for citrus fruits and the like, comprising a substantially closed casing having an inlet for fruit to be grated and an outlet for the grated fruit and means in the casing between the inlet and the outlet for grating the rind from the fruit, vertically spaced upwardly convergent cones forming the upper closure for said casing, the lower of said cones being centrally apertured at its apex, refrigerating means associated with the upper cone, and means for drawing off condensation liquid from between said cones from a point adjacent to the periphery thereof.

10. A grating machine for citrus fruits and the like, comprising a substantially closed casing having an inlet for fruit to be grated and an outlet for the grated fruit and means in the casing between the inlet and the outlet for grating the rind from the fruit, vertically spaced upwardly convergent cones forming the upper closure for said casing, the lower of said cones being centrally apertured at its apex, refrigerating means associated with the upper cone, and means for drawing off condensation liquid from between said cones from a point adjacent to the periphery thereof, there being heat insulation mounted about said upper cone and the said refrigerating means.

11. A grating machine comprising a grater cylinder mounted for vertical axial rotation, an inclined shelf concentric with the cylinder and converging toward the lower end thereof, a member rotatable on the same axis as said cylinder and carrying a plurality of circumferentially spaced feeding vanes between said shelf and said grater cylinder, an inlet chute associated with said shelf, detent means for regulating the feed of articles from said inlet chute to said shelf, cam means associated with said member for controlling the operation of said detent means, and an outlet chute associated with said shelf at a point spaced circumferentially about the shelf from said inlet chute.

12. A grating machine comprising a grater cylinder mounted for vertical axial rotation, an inclined shelf concentric with the cylinder and converging toward the lower end thereof, a member rotatable on the same axis as said cylinder and carrying a plurality of circumferentially spaced feeding vanes between said shelf and said grater cylinder, an inlet chute associated with said shelf, detent means for regulating the feed of articles from said inlet chute to said shelf, cam means associated with said member for controlling the operation of said detent means, and an outlet chute associated with said shelf at a point spaced circumferentially about the shelf from said inlet chute, said cam means and detent means providing for the feeding of a plurality of articles into the space ahead of each of said vanes.

13. A grating machine for citrus fruit and the like, comprising a grater cylinder mounted for vertical axial rotation, a conical shelf concentric with said cylinder and converging downwardly, a feeding vane mounted between said shelf and said grater cylinder for rotation about the axis of said cylinder, means for driving said vane and said cylinder in the same direction with the cylinder revolving more rapidly than the vane, said cylinder having a spiral feed groove about its periphery falling in the direction of rotation of the cylinder, and spaced axially extending grater surfaces on the periphery of said cylinder, said feeding vane being cup shaped and convex in the direction of movement thereof.

14. A grating machine for citrus fruit and the like, comprising a grater cylinder mounted for vertical axial rotation, a conical shelf concentric with said cylinder and converging downwardly, a feeding vane mounted between said shelf and said grater cylinder for rotation about the axis of said cylinder, means for driving said vane and said cylinder in the same direction with the cylinder revolving more rapidly than the vane, said cylinder having a spiral feed groove about its periphery falling in the direction of rotation of the cylinder, and spaced axially extending grater surfaces on the periphery of said cylinder, said feeding vane being cup shaped and convex in the direction of movement thereof, and irregularities projecting from the concave face of the vane.

15. A grating machine for citrus fruits and the like, comprising a grater cylinder mounted for vertical axial rotation, a plurality of vertically spaced conical shelves surrounding said cylinder and convergent toward the bottom thereof, a feeding vane mounted between each said shelf and the grater cylinder for rotation about the axis of said cylinder, means for driving said vanes and said cylinder in the same direction with the cylinder having a spiral feed groove about its periphery falling in the direction of rotation of the cylinder and spaced axially extending grater surfaces on the periphery of the cylinder, and an inlet chute associated with the uppermost of said shelves, and a drop chute from each of said shelves to the one therebeneath whereby fruit introduced into the upper shelf of the inlet chute will successively pass along the several shelves then issue from the outlet chute of the lowermost shelf, detent means for regulating the feed through said inlet chute, and cam means movable in unison with said vanes for controlling the operation of said detent means to provide for the delivery of articles to be grated into the spaces ahead of the feeding vanes associated with the uppermost shelf.

HOBERT McKINLEY RIGGLE.
WALTER B. ROSE.

REFERENCES CITED

The following references are of record in the file of this patent:

UNITED STATES PATENTS

| Number | Name | Date |
|---|---|---|
| 686,576 | Blache | Nov. 12, 1901 |
| 1,637,330 | Mannsdorff | Aug. 2, 1927 |
| 1,888,528 | Faulds | Nov. 22, 1932 |
| 1,939,847 | Greist et al. | Dec. 19, 1933 |
| 2,041,111 | Brown | May 19, 1936 |
| 2,134,608 | Hawkins | Oct. 25, 1938 |
| 2,476,630 | Schindler | July 19, 1949 |